United States Patent
Jonker et al.

(10) Patent No.: US 9,249,662 B2
(45) Date of Patent: *Feb. 2, 2016

(54) TIP FOR DEGRADATION TOOL AND TOOL COMPRISING SAME

(75) Inventors: Cornelis Roelof Jonker, Springs (ZA); David Christian Bowes, Springs (ZA); Thembinkosi Shabalala, Springs (ZA); Nedret Can, Didcot (GB)

(73) Assignee: Element Six Abrasives S.A., Luxembourg (LU)

( * ) Notice: Subject to any disclaimer, the term of this patent is extended or adjusted under 35 U.S.C. 154(b) by 28 days.

This patent is subject to a terminal disclaimer.

(21) Appl. No.: 14/114,876

(22) PCT Filed: May 9, 2012

(86) PCT No.: PCT/EP2012/058585
§ 371 (c)(1),
(2), (4) Date: Oct. 30, 2013

(87) PCT Pub. No.: WO2012/152848
PCT Pub. Date: Nov. 15, 2012

(65) Prior Publication Data
US 2014/0084669 A1    Mar. 27, 2014

Related U.S. Application Data

(60) Provisional application No. 61/484,556, filed on May 10, 2011, provisional application No. 61/497,380, filed on Jun. 15, 2011.

(30) Foreign Application Priority Data

May 10, 2011  (GB) .................................. 1107764.1
Jun. 15, 2011  (GB) .................................. 1110105.2

(51) Int. Cl.
*E21C 35/183*  (2006.01)
*E21B 10/567*  (2006.01)
*E21C 35/18*   (2006.01)

(52) U.S. Cl.
CPC ............. *E21C 35/183* (2013.01); *E21B 10/567* (2013.01); *E21B 10/5673* (2013.01); *E21C 2035/1813* (2013.01); *E21C 2035/1816* (2013.01)

(58) Field of Classification Search
CPC .......... E21C 35/183; E21C 2035/1803; E21C 2035/1809; E21C 2035/1813; E21C 2035/1816
USPC ....................................... 299/111, 112 T, 113
See application file for complete search history.

(56) References Cited

U.S. PATENT DOCUMENTS 4,128,136 A    12/1978  Generoux
4,311,490 A    1/1982   Bovenkerk et al.

(Continued)

FOREIGN PATENT DOCUMENTS

EP    699642     9/1996
EP    1330323    7/2003

(Continued)

OTHER PUBLICATIONS

U.S. Appl. No. 14/114,881, Non-Final Office Action mailed Oct. 29, 2014, 7 pages.

(Continued)

*Primary Examiner* — David Bagnell
*Assistant Examiner* — Michael Goodwin
(74) *Attorney, Agent, or Firm* — Dean W. Russell; Clark F. Weight; Kilpatrick Townsend & Stocton LLP

(57) ABSTRACT

A tip for a degradation tool, the tip comprising a PCD structure (20) joined to a cemented carbide substrate (30); the PCD structure comprising a plurality of strata (24, 25) arranged so that adjacent strata have alternating compressive and tensile stress states, adjacent strata comprising different PCD grades and being directly bonded to each other by inter-growth of diamond grains; each stratum having a mean thickness of at most 500 microns; the PCD structure defining a working end including a rounded conical apex (22) having a radius of curvature of 1.3 mm to 4 mm.

19 Claims, 5 Drawing Sheets

(56) References Cited

U.S. PATENT DOCUMENTS

| | | | |
|---|---|---|---|
| 4,766,040 A | 8/1988 | Hillert et al. | |
| 5,127,923 A | 7/1992 | Bunting et al. | |
| 5,135,061 A | 8/1992 | Newton | |
| 5,161,627 A | 11/1992 | Burkett | |
| 5,238,074 A | 8/1993 | Tibbitts et al. | |
| 5,266,388 A | 11/1993 | Santhanam et al. | |
| 5,370,195 A | 12/1994 | Keshavan et al. | |
| 5,630,479 A | 5/1997 | Dennis | |
| 5,645,617 A | 7/1997 | Frushour | |
| 5,722,499 A | 3/1998 | Nguyen et al. | |
| 5,766,394 A | 6/1998 | Anderson et al. | |
| 5,833,021 A | 11/1998 | Mensa-Wilmot et al. | |
| 5,837,071 A | 11/1998 | Andersson et al. | |
| 5,871,060 A | 2/1999 | Jensen et al. | |
| 5,979,579 A | 11/1999 | Jurewicz | |
| 6,068,913 A | 5/2000 | Cho et al. | |
| 6,187,068 B1 | 2/2001 | Frushour et al. | |
| 6,193,001 B1 | 2/2001 | Eyre et al. | |
| 6,258,139 B1 | 7/2001 | Jensen | |
| 6,290,008 B1 | 9/2001 | Portwood et al. | |
| 6,315,065 B1 | 11/2001 | Yong et al. | |
| 6,443,248 B2 | 9/2002 | Yong et al. | |
| 6,446,740 B2 | 9/2002 | Eyre | |
| 6,544,308 B2 | 4/2003 | Griffin et al. | |
| 6,592,985 B2 | 7/2003 | Griffin et al. | |
| 6,601,662 B2 | 8/2003 | Matthias et al. | |
| 6,655,481 B2 | 12/2003 | Findley et al. | |
| 6,733,087 B2 | 5/2004 | Hall et al. | |
| 6,779,951 B1 | 8/2004 | Vale et al. | |
| 7,353,893 B1 | 4/2008 | Hall et al. | |
| 7,464,993 B2 | 12/2008 | Hall et al. | |
| 7,469,756 B2 | 12/2008 | Hall et al. | |
| 7,469,972 B2 | 12/2008 | Hall et al. | |
| 7,588,102 B2 | 9/2009 | Hall et al. | |
| 7,600,823 B2 | 10/2009 | Hall et al. | |
| 7,665,552 B2 | 2/2010 | Hall et al. | |
| 7,669,674 B2 | 3/2010 | Hall et al. | |
| 7,669,938 B2 | 3/2010 | Hall et al. | |
| 7,694,757 B2 | 4/2010 | Keshavan | |
| 7,950,746 B2 | 5/2011 | Hall et al. | |
| 8,590,643 B2 | 11/2013 | Smallman et al. | |
| 2003/0131787 A1 | 7/2003 | Linares et al. | |
| 2003/0176126 A1 | 9/2003 | Mulligan et al. | |
| 2006/0166615 A1* | 7/2006 | Tank et al. | 451/540 |
| 2006/0180354 A1 | 8/2006 | Belnap et al. | |
| 2006/0191723 A1 | 8/2006 | Keshavan | |
| 2006/0219439 A1 | 10/2006 | Shen et al. | |
| 2008/0035383 A1 | 2/2008 | Hall et al. | |
| 2008/0142267 A1 | 6/2008 | Griffin et al. | |
| 2009/0051211 A1 | 2/2009 | Hall et al. | |
| 2009/0090563 A1 | 4/2009 | Voronin et al. | |
| 2009/0152017 A1 | 6/2009 | Shen et al. | |
| 2009/0152018 A1 | 6/2009 | Sani | |
| 2009/0166094 A1 | 7/2009 | Keshavan et al. | |
| 2009/0263308 A1 | 10/2009 | Hall et al. | |
| 2009/0273224 A1 | 11/2009 | Hall | |
| 2010/0059289 A1 | 3/2010 | Hall et al. | |
| 2010/0065338 A1 | 3/2010 | Hall et al. | |
| 2010/0065339 A1 | 3/2010 | Hall et al. | |
| 2010/0071964 A1 | 3/2010 | Hall et al. | |
| 2010/0206641 A1 | 8/2010 | Hall et al. | |
| 2010/0263939 A1 | 10/2010 | Hall et al. | |
| 2010/0294571 A1 | 11/2010 | Belnap et al. | |
| 2011/0031033 A1* | 2/2011 | Mourik et al. | 175/428 |
| 2011/0132667 A1 | 6/2011 | Smallman et al. | |

FOREIGN PATENT DOCUMENTS

| | | |
|---|---|---|
| EP | 1338582 | 8/2003 |
| EP | 1932947 | 6/2008 |
| EP | 2053198 | 4/2009 |
| GB | 2377722 | 1/2003 |
| WO | 0060137 | 10/2000 |
| WO | 2004106693 | 12/2004 |
| WO | 2004111284 | 12/2004 |
| WO | 2008076420 | 6/2008 |
| WO | 2008096402 | 8/2008 |
| WO | 2008114228 | 9/2008 |
| WO | 2007144731 | 12/2008 |
| WO | 2009024752 | 2/2009 |
| WO | 2009125355 | 10/2009 |
| WO | 2010135605 | 11/2010 |
| WO | 2011012708 | 2/2011 |
| WO | 2011069637 | 6/2011 |

OTHER PUBLICATIONS

Lammer, Mechanical properties of polycrystalline diamonds, Materials Science and Technology, vol. 4, Nov. 1988, pp. 949-955.

Karasawa et al., Development of New PDC Bits for Drilling of Geothermal Wells-Part 1: Laboratory Testing, Journal of Energy Resources Technology, National Institute for Resources and Environment, Ibaraki, Japan, vol. 114, Dec. 1992, pp. 323-331.

Miess et al., Fracture toughness and thermal resistance of polycrystalline diamond compacts, Materials Science and Engineering A209, 1996, pp. 270-276.

Clegg, Controlling Cracks in Ceramics, Materials Science, vol. 286 No. 5442, http://www.sciencemag.org/content/286/5442/1097.full, Nov. 5, 1999, pp. 1097-1099.

Munz et al., Mechanical Properties, Failure Behaviour, Materials Selection, Springer Series in Materials Science, 2001, 24 pages.

Paggett et al., Residual stress and stress gradients in polycrystalline diamond compacts, International Journal of Refractory Metals & Hard Materials 20, 2002, pp. 187-194.

Blugan et al., Laminate Ceramics with Ultra-High Fracture Toughness, EMPA, May, 2002, 1 page.

Orlovskaya et al., Robust design and manufacturing of ceramic laminates with controlled thermal residual stresses for enhanced toughness, Journal of Materials Science 40, 2005, pp. 5483-5490.

United Kingdom Patent Application No. GB1110105.2, Examination Report mailed on Oct. 17, 2011, 6 pages.

United Kingdom Patent Application No. GB1208099.0, Examination Report mailed on Aug. 10, 2012, 8 pages.

United Kingdom Patent Application No. GB1208107.1, Examination Report mailed on Aug. 13, 2012, 8 pages.

International Patent Application No. PCT/EP2012/058585, International Search Report & Written Opinion mailed on Apr. 24, 2013, 13 pages.

* cited by examiner

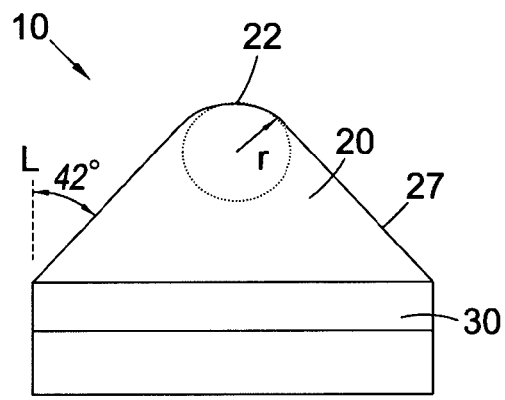
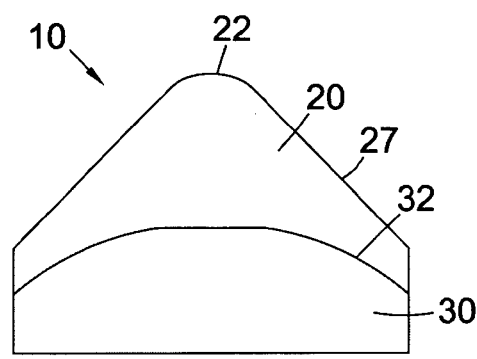
Fig. 1A  Fig. 1B
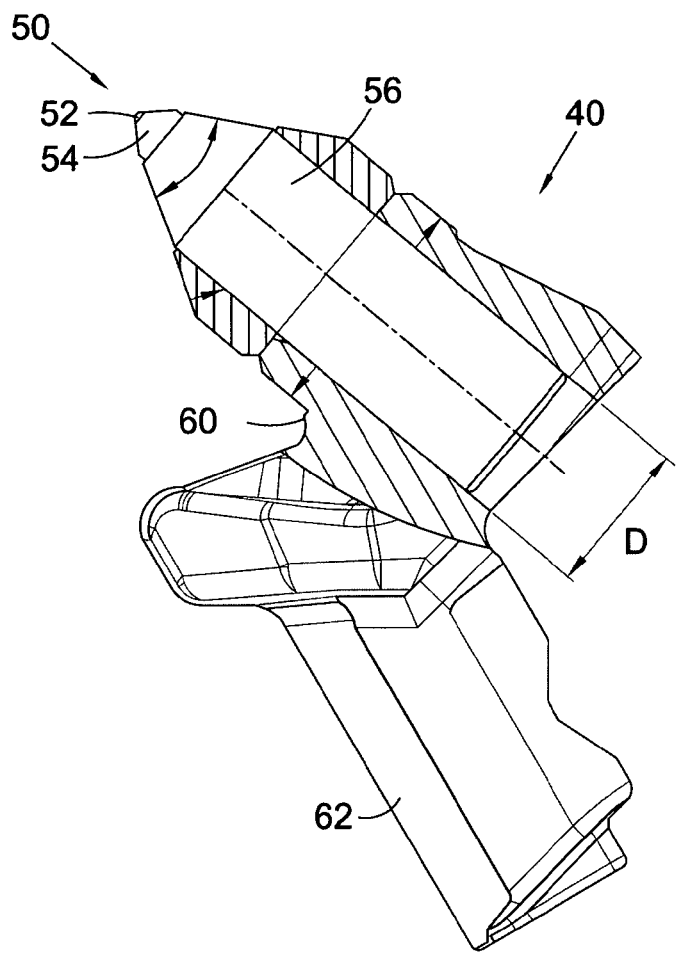
Fig. 2

TIP FOR DEGRADATION TOOL AND TOOL COMPRISING SAME

CROSS REFERENCE TO RELATED APPLICATIONS

This application is the U.S. national phase of International Application No. PCT/EP2012/058585 filed on May 9, 2012, and published in English on Nov. 15, 2012 as International Publication No. WO 2012/152848 A2, which application claims priority to Great Britain Patent Application No. 1107764.1 filed on May 10, 2011, U.S. Provisional Application No. 61/484,556 filed on May 10, 2011, Great Britain Patent Application No. 1110105.2 filed on Jun. 15, 2011, and U.S. Provisional Application No. 61/497,380 filed on Jun. 15, 2011, the contents of all of which are incorporated herein by reference.

The disclosure relates generally to a tip for a degradation tool, particularly but not exclusively to a pick for degrading road pavement, mining or for boring into the earth.

A degradation tool such as a pick may be used for breaking, boring into or otherwise degrading structures or bodies, such as rock, asphalt, coal or concrete and may be used in applications such as mining, construction and road reconditioning. A degradation tool such as a percussion drill may comprise insert tips for crushing rock. Some degradation tools may comprise a working tip or insert comprising synthetic diamond material, which is likely to have better abrasion resistance than working tips formed of cemented tungsten carbide material. However, synthetic and natural diamond material tends to be more brittle and less resistant to fracture than cemented carbide material and this tends to reduce its potential usefulness in pick and percussion drill operations.

U.S. Pat. No. 7,665,552 discloses a super-hard insert comprising a carbide substrate bonded to ceramic layer. The carbide substrate may comprise a generally frusto-conical end with a tapered portion leading to a flat portion and the ceramic layer may comprise diamond. Preferably, the ceramic layer is a monolayer, but in other embodiments, the ceramic layer may comprise a plurality of sub-layers.

There is a need to provide super-hard tips for degradation tools that have long working life.

Viewed from a first aspect, there is provided a tip for a degradation tool, the tip comprising a PCD structure joined to a cemented carbide substrate (at an interface boundary); the PCD structure comprising a plurality of strata arranged so that adjacent strata have alternating compressive and tensile residual stress states, adjacent strata comprising different PCD grades and being directly bonded to each other by intergrowth of diamond grains (i.e. direct inter-diamond grain bonding); each stratum having a mean thickness of at most about 500 microns; in which the PCD structure has a working end including an apex having 1.3 mm to 4 mm, or 1.3 mm to 3.2 mm radius of curvature (longitudinally, in a plane through the apex). At least a part of the working end may have the general shape of a rounded cone, in which the apex is defined by the rounded point of the cone shape. The stress states of adjacent strata may be said to oppose each other in that one of a pair of adjacent strata will be in a state of relative tension and the other in a state of relative compression. Each stratum may have a thickness of at least about 30 microns and at most about 300 microns. The strata may be said to be layers or generally stratified regions.

Viewed from a second aspect, there is provided a tip for a degradation tool, the tip comprising a PCD structure joined to a cemented carbide substrate, the PCD structure having at least two compressed regions in respective compressive residual stress states and at least one tensioned region in a tensile residual stress state; the tensioned region disposed between and integrally formed with each of the compressed regions. The compressed regions may comprise at least a first and a third PCD grade and the tensioned region may comprise a second PCD grade, and at least the second PCD grade may have transverse rupture strength (TRS) of at least about 1,200 MPa. The second PCD grade may be selected to have a TRS of at least about 1,600 MPa or at least about 1,800 MPa. Some examples of PCD structures may have at least 3, at least 5, at least 7, at least 10 or even at least 15 compressed regions, with tensioned regions located between them. The PCD structure may define a working end including an apex having 1.3 mm to 4 mm, or 1.3 mm to 3.2 mm radius of curvature (longitudinally, in a plane through the apex). At least a part of the working end may have the general shape of a rounded cone, in which the apex is defined by the rounded point of the cone shape.

Various arrangements and combinations are envisaged by this disclosure for tips according to the above aspects, of which the following are non-limiting and non-exhaustive examples.

In some example arrangements, the PCD structure may comprise a first region and a second region adjacent the first region, the second region being bonded to the first region by intergrowth of diamond grains. The first region may comprise a plurality of alternating strata or layers, each stratum or layer having a thickness in the range of around 30 to 300 microns; the second region comprising a plurality of strata or layers, one or more strata or layers in the second region having a thickness greater than the thicknesses of the individual strata or layers in the first region, the first layers or strata being in a state of residual compressive stress and the second layers or strata being in a state of residual tensile stress.

In some example arrangements, the tip may comprise a PCD structure bonded to a cemented metal carbide substrate at a non-planar interface or at a substantially planar interface. The PCD structure may have a 2.5 mm to 10 mm thickness from the apex to the interface boundary between the PCD structure and the substrate. In one example arrangement, the interface may comprise a slight convex shape. The PCD structure may have a side which forms a 35 degree to 55 degree angle with a central longitudinal axis of the tip, and in one particular example, the angle may be substantially 45 degrees. In one example arrangement, the PCD structure may have a volume in the range from 75 percent to 150 percent of the volume of the carbide substrate.

In some example arrangements, the PCD structure may comprise at least five strata or regions, the strata or regions may be disposed adjacent a working surface defined by the PCD structure and or the strata may be generally conformal with the working surface.

In some example arrangements, the strata or regions may be disposed at an angle to the working surface, they may intersect the working surface, or the configuration of the strata or regions with respect to the working surface may vary with position in the PCD structure.

In some example arrangements, the PCD structure may comprise a plurality of strata or regions of alternating PCD grades. Each stratum or region may comprise one of two PCD grades, adjacent strata or regions comprising different PCD grades. The PCD grades comprised in the strata or regions may have transverse rupture strength (TRS) of at least 1,200 MPa. The PCD structure may comprise thermally stable PCD material, such as PCD material from which catalyst material has been removed of depleted.

In some example arrangements, strata or regions may comprise at least about 2 weight percent and or at most about 20 weight percent nano-diamond powder grains; strata or regions may comprise salt; strata or regions may comprise borides or carbide compounds of at least one of Ti, V or Nb; and or strata or regions may comprise at least one of the metals Pd or Ni.

Viewed from a third aspect there is provided a degradation tool comprising a disclosed tip can also be provided. The tool may be a drill bit or a component of a drill bit for boring into the earth, or a pick or an anvil for degrading or breaking hard material such as asphalt or rock.

A method is provided for making a tip for a degradation tool, the tip comprising a PCD structure bonded to a cemented carbide substrate; the method including providing a first aggregation comprising a plurality of diamond grains having a first mean size, and providing a second aggregation comprising a plurality of diamond grains having a second mean size; arranging the first and second aggregations in an alternating configuration to form a pre-sinter assembly; and treating the pre-sinter assembly in the presence of a catalyst material for diamond at an ultra-high pressure and high temperature at which diamond is more thermodynamically stable than graphite to sinter together the diamond grains and form an integral PCD structure.

Disclosed example arrangements may have the aspect of enhanced fracture resistance and extended tool life.

Example arrangements of tips for degradation tools will now be described with reference to the accompanying drawings, of which:

FIG. 1A shows a schematic side view of an example tip for a pick for a pavement degradation tool; and FIG. 1B shows a schematic longitudinal cross section view through the example tip;

FIG. 2 shows a schematic partly cut-away side view of an example pick tool for a road pavement degradation apparatus;

Figure 3:
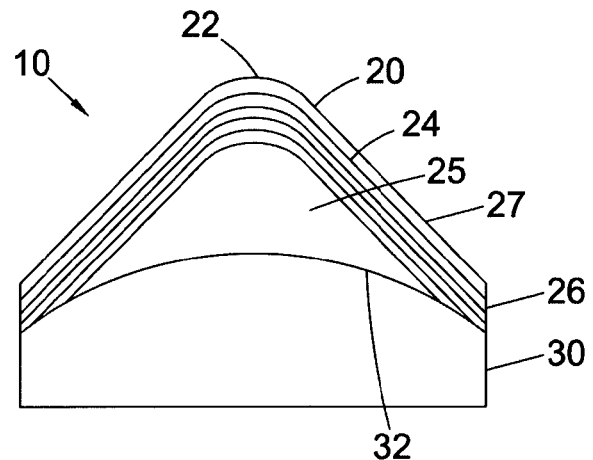
FIG. 3 to FIG. 13 show schematic longitudinal cross section views through example tips for a pick.

Example tips may be for a pick tool for a road milling apparatus, generally as disclosed in United States patent application publication number 2010065338.

With reference to FIG. 1A and FIG. 1B, an example tip 10 for a pick for road pavement milling comprises a PCD structure 20 bonded to a cemented carbide substrate 30 at a non-planar interface boundary 32. In this particular example, the PCD structure 20 defines a working surface 27 having the general shape of a rounded or blunted cone having an apex 22 with a radius of curvature r of about 2.1 mm. The thickness from the apex 22 to the interface boundary 32 may be about 5.3 mm and the conical part of the working surface 27 may be inclined at an angle of about 42 degrees with respect to a longitudinal axis L. At the interface boundary 32, the substrate 30 may have a tapered boundary surface 32 starting from a cylindrical rim of the substrate 30 and ending at an elevated, substantially flat central region formed in the substrate 30, and the flat central region may have a diameter of at least about 3.2 mm to about 6 mm.

With reference to FIG. 2, an example pick tool 40 for road pavement degradation comprises an insert 50 shrink-fit within a steel holder 60. The insert 50 may comprise a tip 52 joined to a cemented carbide segment 54, which is joined to a shaft 56, a major part of the shaft 56 being held in compression within a bore formed within the holder 60. The holder comprises a coupler shank 62 for coupling the holder 60 to a drum apparatus (not shown).

With reference to FIG. 3 to FIG. 11, example tips 10 comprise PCD structures 20 bonded to respective cemented carbide substrates 30. Each of the PCD structures 20 defines a respective working surface 27 having the general shape of a rounded or blunted cone having an apex 22 with a radius of curvature (in the longitudinal plane through the apex). Each PCD structure 20 comprises a plurality of layers or strata 24, each of which may comprise any of at least two different grades of PCD material. Consecutive strata or layers 24 may comprise different grades of PCD material and the PCD grades may be arranged alternately. The layers or strata 24 may be configured to direct cracks generated near the working surface 27 in use away from an inner region of the PCD structure. In some arrangements, the layers or strata 24 may be arranged generally aligned with at least part of the working surface 27 and may be proximate the working surface 27. In some arrangements the PCD structure 20 may comprise a region 25 that is substantially free of layers or strata, being a continuous region of substantially uniform PCD grade.

In the particular arrangement shown in FIG. 3, the substrate 30 has a generally convex boundary 32 at the interface with the PCD structure 20, which comprises a plurality of strata 24 proximate and generally conformal with the working surface 27. At least some of the strata 24 may terminate at a peripheral side surface 26 of the PCD structure 20 and at least some of the strata 24 may terminate at the boundary 32 of the substrate. In this example, the PCD structure 20 comprises a central inner region 25 that is free of strata or layers.

Figure 4:
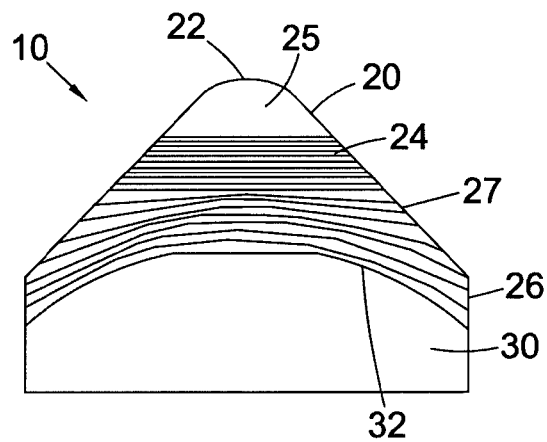
Figure 5:
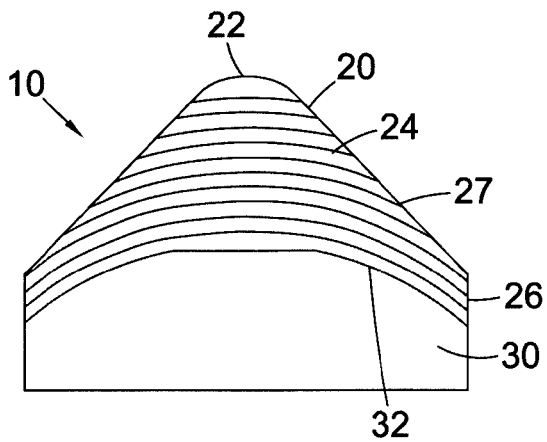
Figure 6:
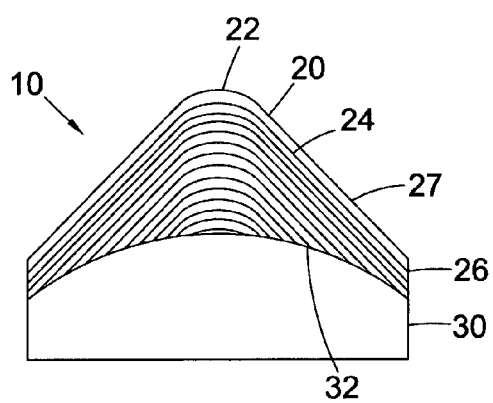

In the particular arrangements shown in FIG. 4, FIG. 5 and FIG. 6, the substrate 30 has a generally convex boundary 32 at the interface and the PCD structure 20 comprises a plurality of strata 24 arranged generally laterally, at least some of which may be bowed or arcuate, and at least those strata proximate the interface may be generally conformal with the convex boundary 32. At least some of the strata 24 may terminate at a peripheral side surface 26 of the PCD structure 20. In the examples shown in FIG. 4 and FIG. 5, some of the strata 24 may terminate at the working surface 27. In the example illustrated in FIG. 4, a region 25 of the PCD structure adjacent the apex 22 is free of strata or layers. In the example illustrated in FIG. 6, at least some of the strata 24 terminate at the boundary 32 of the substrate.

Figure 7:
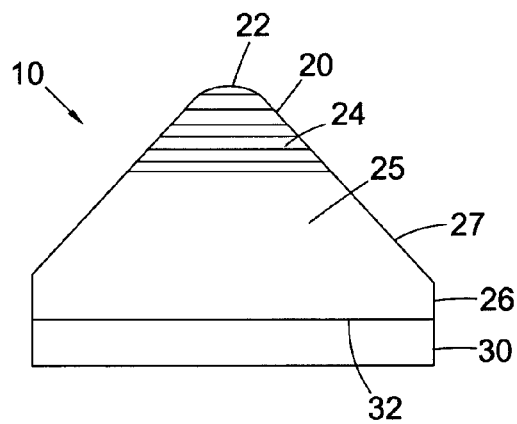

In the particular arrangement shown in FIG. 7, the substrate 30 has a generally planar boundary 32 at the interface and the PCD structure 20 comprises a plurality of strata 24 arranged generally laterally 32 and located proximate the apex 22. In this example, the PCD structure 20 comprises a central inner region 25 that is free of strata or layers. At least some of the strata may terminate at the working surface 27.

Figure 8:
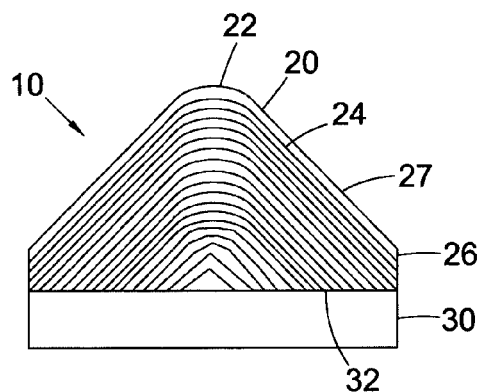

In the particular arrangement shown in FIG. 8, the substrate 30 has a generally planar boundary 32 at the interface and the PCD structure 20 comprises a plurality of strata 24 that are generally conformal with the working surface 27. At least some of the strata 24 may terminate at a peripheral side surface 26 of the PCD structure 20, and at least some of the strata 24 may terminate at the boundary 32 of the substrate.

Figure 9:
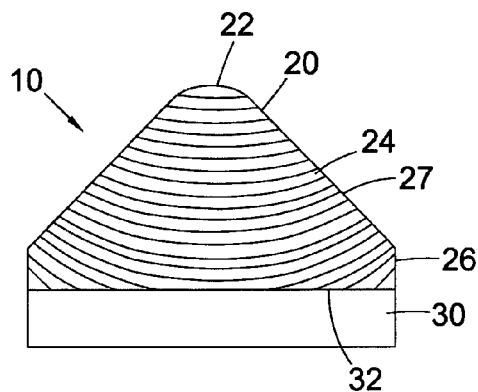
Figure 10:
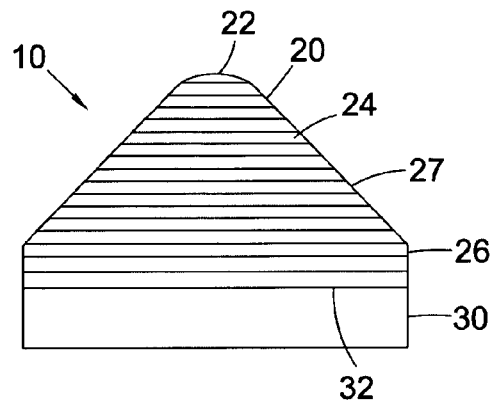
Figure 11:
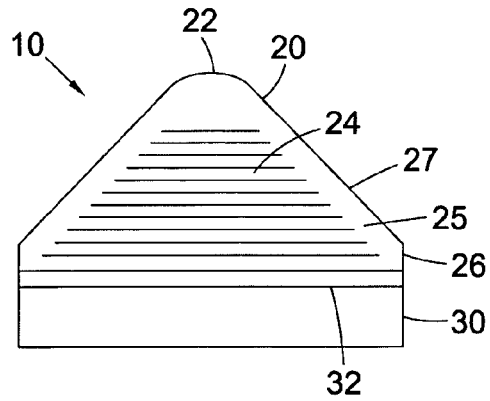

In the particular arrangements shown in FIG. 9, FIG. 10 and FIG. 11, the substrate 30 has a generally planar boundary 32 at the interface and the PCD structure 20 comprises a plurality of strata 24 that extend generally laterally (some may be bowed or dished). At least some of the strata 24 may terminate at a peripheral side surface 26 of the PCD structure 20. In the example shown in FIG. 9 at least some of the strata 24 are arranged to be generally concave with respect to the working surface 27 and at least some of the strata 24 may terminate at the boundary 32 of the substrate. In the examples shown in FIG. 10 and FIG. 11, the strata are substantially planar and conformal with the substrate boundary 32. In the example shown in FIG. 11, there is a region 25 adjacent the working surface 27 that is free of strata, at least some of the strata 24 terminating at a boundary of this region 25 (i.e. these strata do not extend to the working surface).

Figure 12:
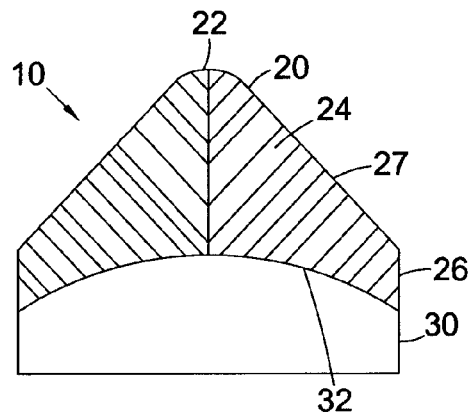

In the example arrangement shown in FIG. 12, the substrate 30 has a generally convex boundary 32 at the interface with the PCD structure 20, which comprises a plurality of strata 24. The strata 24 are arranged to terminate at the working surface 27 at an angle of at least about 45 degrees and at most about 135 degrees and to form generally inverted cone-shaped layers. At least some of the strata 24 may terminate at a peripheral side surface 26 of the PCD structure 20 and at least some of the strata 24 may terminate at the boundary 32 of the substrate.

Figure 13:
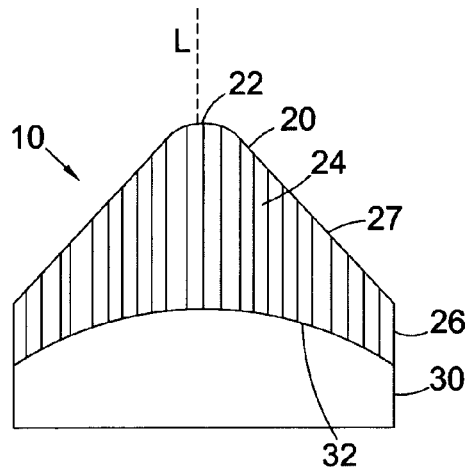

In the example arrangement shown in FIG. 13, the substrate 30 has a generally convex boundary 32 at the interface with the PCD structure 20, which comprises a plurality of strata 24. The strata 24 are arranged as generally concentric cylinders aligned with the longitudinal axis of the tip 10. At least some of the strata 24 may terminate at a peripheral side surface 26 of the PCD structure 20 and at least some of the strata 24 terminate at the boundary 32 of the substrate at an angle of at least about 60 degrees and at most about 120 degrees.

Figure 14:
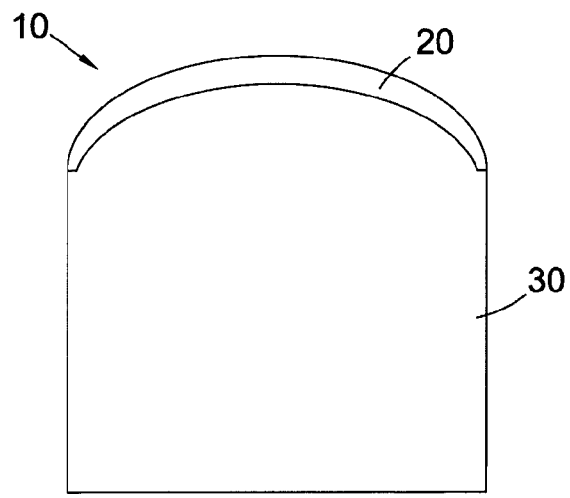
FIG. 14 and FIG. 15 show a schematic side view and a schematic longitudinal cross section view, respectively, through an example tip for a percussion drill.
Figure 15:
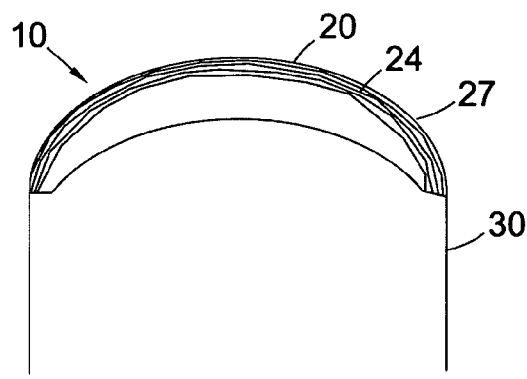

With reference to FIG. 14 and FIG. 15, an example tip 10 for a percussive drill (not shown) comprises a PCD structure 20 joined to a cemented carbide substrate 30. The PCD structure is in the general form of a layer defining a generally dome-like working surface. The PCD structure 20 may comprise strata 24 arranged generally conformal with a working surface 27 of the PCD structure.

The table below shows approximate compositional characteristics and properties of three example PCD grades referred to as PCD grades I, II and III. All of the PCD grades comprise interstitial regions filled with material comprising cobalt metal, which is an example of catalyst material for diamond.

|  | PCD grade I | PCD grade II | PCD grade III |
|---|---|---|---|
| Mean grain size, microns | 7 | 11 | 16 |
| Catalyst content, vol. % | 11.5 | 9.0 | 7.5 |
| TRS, MPa | 1,880 | 1,630 | 1,220 |
| $K_1C$, MPa·$m^{1/2}$ | 10.7 | 9.0 | 9.1 |
| E, GPa | 975 | 1,020 | 1,035 |
| CTE, $10^{-6}$ mm/° C. | 4.4 | 4.0 | 3.7 |

Figure 16:
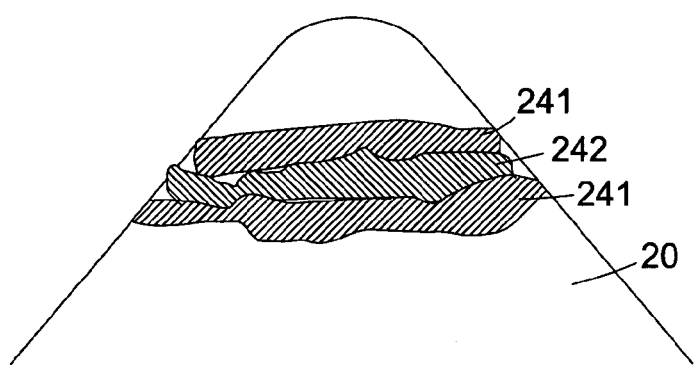
FIG. 16 shows a schematic cross-section view of part of an example tip.

With reference to FIG. 16 an example PCD structure 20 comprises at least two spaced-apart compressed strata 241 in compressive residual stress states and at least one tensioned stratum 242 in a tensile residual stress state. The tensioned stratum 242 is located between the compressed strata 241 and is joined to them by directly inter-bonded diamond grains. In this particular example, the tensioned stratum 242 comprises PCD grade I and the compressed strata 242 comprise PCD grade III. In another variant, the tensioned stratum 242 comprises PCD grade II and the compressed strata 242 comprise PCD grade III.

PCD grades may be selected to achieve the configuration of a tensioned stratum between two compressed strata. For example, variations in mechanical properties such as density, elastic modulus, hardness and coefficient of thermal expansion (CTE) may be selected for this purpose. Such variations may be achieved by means of variations in content of diamond grains, content and type of filler material, size distribution or mean size of the PCD grains.

The PCD structure may have a surface region proximate a working surface, the region comprising PCD material having a Young's modulus of at most about 1,050 MPa, or at most about 1,000 MPa. The surface region may comprise thermally stable PCD material.

Each stratum or layer may have a thickness of at least about 50 microns, at least about 100 microns, or at least about 200 microns. Each stratum or layer may have a thickness of at most about 500 microns. In some example embodiments, each stratum or layer may have a thickness of at least about 0.05 percent, at least about 0.5 percent, at least about 1 percent or at least about 2 percent of a thickness of the PCD structure measured from a point on a working surface at one end to a point on an opposing surface. In some embodiments, each stratum or layer may have a thickness of at most about 5 percent of the thickness of the PCD structure.

The residual stress state of a PCD structure, including a layer structure may be measured by means of a strain gauge and progressively removing material layer by layer. In some examples of PCD elements, at least one compressed stratum may have a compressive residual stress of at least about 50 MPa, at least about 100 MPa, at least about 200 MPa, at least about 400 MPa or even at least about 600 MPa. The difference between the magnitude of the residual stress of adjacent strata may be at least about 50 MPa, at least about 100 MPa, at least about 200 MPa, at least about 400 MPa, at least about 600 MPa, at least about 800 MPa or even at least about 1,000 MPa. In one example, at least two successive compressed strata or tensioned strata may have different residual stresses. The PCD structure may comprise at least three compressed or tensioned strata each having a different residual compressive stress, the strata arranged in increasing or decreasing order of compressive or tensile stress magnitude, respectively.

In one example, each of the strata may have a mean toughness of at most 16 MPa·$m^{1/2}$. In some embodiments, each of the strata may have a mean hardness of at least about 50 GPa, or at least about 60 GPa. Each of the strata may have a mean Young's modulus of at least about 900 MPa, at least about 950 MPa, at least about 1,000 or even at least about 1,050 MPa.

While the provision of a PCD structure with PCD strata having alternating compression and tensile stress states tends to increase the overall effective toughness of the PCD structure, this may have the effect of increasing the potential incidence of de-lamination, in which the strata may tend to come apart. While wishing not to be bound by a particular theory, de-lamination may tend to arise if the PCD strata are not sufficiently strong to sustain the residual stress between them. This effect may be ameliorated by selecting the PCD grades, and the PCD grade of which the tensioned stratum in particular is formed, to have sufficiently high TRS. The TRS of the PCD grade or grades of which the tensioned stratum is formed should be greater than the residual tension that it may experience. One way of influencing the magnitude of the stress that a stratum may experience is by selecting the relative thicknesses of adjacent strata. For example, by selecting the thickness of a tensioned stratum to be greater than that of the adjacent compressive strata is likely to reduce the magnitude of tensile stress within the tensioned stratum.

Adjacent strata comprising different grades of PCD are bonded together by direct diamond-to-diamond intergrowth to form an integral, solid and stratified PCD structure. The shapes of the PCD strata may be curved, bowed or distorted in some way as a result of being subjected to the ultra-high pressure. In some versions of the method, the aggregations may be arranged in the pre-sinter assembly to achieve various other configurations of strata within the PCD structure, taking into account possible distortion of the arrangement during the ultra-high pressure and high temperature treatment.

The strata may comprise different respective PCD grades as a result of the different mean diamond grain sizes of the strata. Different amounts of catalyst material may infiltrate into the different types of discs comprised in the pre-sinter assembly since they comprise diamond grains having different mean sizes, and consequently different sizes of spaces between the diamond grains. The corresponding alternating PCD strata may thus comprise different, alternating amounts of catalyst material for diamond. The content of the filler material in terms of volume percent within the tensioned stratum may be greater than that within each of the compressed strata.

In one example, the compressed strata may comprise diamond grains having mean size greater than the mean size of the diamond grains of the tensioned strata. For example, the mean size of the diamond grains in the tensioned strata may be at most about 10 microns, at most about 5 microns or even at most about 2 microns, and at least about 0.1 microns or at least about 1 micron. In some embodiments, the mean size of the diamond grains in each of the compressed strata may be at least about 5 microns, at least about 10 microns or even at least about 15 microns, and at most about 30 microns or at most about 50 microns.

The residual stress states of the strata may vary with temperature. In use, the temperature of the PCD structure may differ substantially between points proximate a cutting edge and points remote from the cutting edge. In some uses, the temperature proximate the cutting edge may reach several hundred degrees centigrade. If the temperature exceeds about 750 degrees centigrade, diamond material in the presence of catalyst material such as cobalt is likely to convert to graphite material, which is not desired. Therefore, in some uses, the alternating stress states in adjacent strata as described herein should be considered at a temperature of up to about 750 degrees centigrade.

In example tips, the PCD structure may be formed joined to the substrate at an ultra-high pressure. In other words, the PCD structure may become bonded to the substrate at the same time as the PCD structure was formed by the sintering together of a plurality of diamond particles.

An example method for making a PCD element is now described. Aggregations in the form of sheets containing diamond grains held together by a binder material may be provided. The sheets may be made by a method known in the art, such as by extrusion or tape casting methods, in which slurries comprising diamond grains having respective size distributions suitable for making the desired respective PCD grades, and a binder material is spread onto a surface and allowed to dry. Other methods for making diamond-containing sheets may also be used, such as described in U.S. Pat. Nos. 5,766,394 and 6,446,740. Alternative methods for depositing diamond-bearing layers include spraying methods, such as thermal spraying. The binder material may comprise a water-based organic binder such as methyl cellulose or polyethylene glycol (PEG) and different sheets comprising diamond grains having different size distributions, diamond content or additives may be provided. For example, at least two sheets comprising diamond having different mean sizes may be provided and first and second sets of discs may be cut from the respective first and second sheets. The sheets may also contain catalyst material for diamond, such as cobalt, and/or additives for inhibiting abnormal growth of the diamond grains or enhancing the properties of the PCD material.

For example, the sheets may contain about 0.5 weight percent to about 5 weight percent of vanadium carbide, chromium carbide or tungsten carbide. In one example, each of the sets may comprise about 10 to 20 discs.

A support body comprising cemented carbide in which the cement or binder material comprises a catalyst material for diamond, such as cobalt, may be provided. The support body may have a non-planar end or a substantially planar proximate end on which the PCD structure is to be formed. A non-planar shape of the end may be configured to reduce undesirable residual stress between the PCD structure and the support body. A cup may be provided for use in assembling the diamond-containing sheets onto the support body. The first and second sets of discs may be stacked into the bottom of the cup in alternating order. In one version of the method, a layer of substantially loose diamond grains may be packed onto the uppermost of the discs. The support body may then be inserted into the cup with the proximate end going in first and pushed against the substantially loose diamond grains, causing them to move slightly and position themselves according to the shape of the non-planar end of the support body to form a pre-sinter assembly.

The pre-sinter assembly can be placed into a capsule for an ultra-high pressure press and subjected to an ultra-high pressure of at least about 5.5 GPa and a high temperature of at least about 1,300 degrees centigrade to sinter the diamond grains and form a PCD element comprising a PCD structure integrally joined to the support body. In one version of the method, when the pre-sinter assembly is treated at the ultra-high pressure and high temperature, the binder material within the support body melts and infiltrates the strata of diamond grains. The presence of the molten catalyst material from the support body is likely to promote the sintering of the diamond grains by intergrowth with each other to form an integral, stratified PCD structure.

In some versions of the method, the aggregations may comprise substantially loose diamond grains, or diamond grains held together by a binder material. The aggregations may be in the form of granules, discs, wafers or sheets, and may contain catalyst material for diamond and/or additives for reducing abnormal diamond grain growth, for example, or the aggregation may be substantially free of catalyst material or additives. In one version, the first mean size may be in the range from about 0.1 micron to about 15 microns, and the second mean size may be in the range from about 10 microns to about 40 microns. In one version, the aggregations may be assembled onto a cemented carbide support body.

An example pre-sinter assembly for making a PCD element may comprise a support body, a region comprising diamond grains packed against a non-planar end of the support body, and a plurality of alternating diamond-containing aggregations in the general form of discs or wafers stacked on the region. In some versions, the aggregations may be in the form of loose diamond grains or granules. The pre-sinter assembly may be heated to remove the binder material comprised in the stacked discs.

While wishing not to be bound by a particular theory, when the stratified PCD structure is allowed to cool from the high temperature at which it was formed, the alternating strata containing different amounts of metal catalyst material may contract at different rates. This may be because metal contracts much more substantially than diamond does as it cools from a high temperature. This differential rate of contraction may cause adjacent strata to pull against each other, thus inducing opposing stresses in them.

Example methods may further include processing the tip by grinding to modify its shape. This may involve removing part of some of the curved strata to form a substantially planar working surface and a substantially cylindrical side surface. Catalyst material may be removed from a region of the PCD structure adjacent the working surface or the side surface or both the working surface and the side surface. This may be done by treating the PCD structure with acid to leach out catalyst material from between the diamond grains, or by other methods such as electrochemical methods. A thermally stable region, which may be substantially porous, extending a depth of at least about 50 microns or at least about 100 microns from a surface of the PCD structure, may thus be provided. In one example, the substantially porous region may comprise at most 2 weight percent of catalyst material.

Some of the combinations envisaged by the disclosure are described below.

A PCD structure comprising a first region, a second region and a third region; the second region disposed between and bonded to the first and third strata by intergrowth of diamond grains; each region formed of a respective PCD grade comprising at least 85 volume percent diamond grains having a mean size of at least 0.1 micron and at most 30 micron; the PCD grade comprised in the second region containing a higher content of metal than is contained in each of the respective PCD grades comprised in the first and in the third strata. The PCD grade comprised in the second region may contain at least 9 volume percent metal.

A PCD structure comprising a first stratum, a second stratum and a third stratum; the second stratum disposed between and bonded to the first and third strata by intergrowth of diamond grains; each stratum formed of a respective PCD grade having a TRS of at least 1,200 MPa; the PCD grade comprised in the second stratum containing more metal than is contained in each of the respective PCD grades comprised in the first and in the third strata. The PCD grade comprised in the second stratum may contain at least 9 volume percent metal.

The strata may be in the form of strata arranged in an alternating configuration to form an integral, stratified PCD structure. The strata may have thickness of at least about 10 microns and at most about 500 microns, and the strata may be generally planar, curved, bowed or domed. The strata may intersect a working surface or side surface of the PCD structure. The PCD grade comprised in the first and third strata may comprise diamond grains having a different mean size than the diamond grains comprised in the second PCD grade. The volume or thickness of the second stratum may be greater than the volume or thickness of the first stratum and the volume or thickness of the third stratum.

A PCD element comprising a PCD structure bonded to a cemented carbide support body can be provided. The PCD element may be substantially cylindrical and have a substantially planar working surface, or a generally domed, pointed, rounded conical or frusto-conical working surface. The PCD element may be for a rotary shear (or drag) bit for boring into the earth, for a percussion drill bit or for a pick for mining or asphalt degradation.

A non-limiting example arrangement is described in detail below.

First and second sheets, each containing diamond grains having a different mean size and held together by an organic binder were made by the tape casting method. This method involved providing respective slurries of diamond grains suspended in liquid binder, casting the slurries into sheet form and allowing them to dry to form self-supportable diamond-containing sheets. The mean size of the diamond grains within the first sheet was in the range from about 5 microns to about 14 microns, and the mean size of the diamond grains within the second sheet was in the range from about 18 microns to about 25 microns. Both sheets also contained about 3 weight percent vanadium carbide and about 1 weight percent cobalt. After drying, the sheets were about 0.12 mm thick. Fifteen circular discs having diameter of about 13 mm were cut from each of the sheets to provide first and seconds sets of disc-shaped wafers.

A support body formed of cobalt-cemented tungsten carbide may be provided. The support body may generally be cylindrical in shape, having a diameter of about 13 mm and a non-planar end formed with a central projecting member. A mold defining a generally conical shape may be provided for assembling a pre-sinter assembly. The diamond-containing wafers may be placed into the mold, alternately stacked on top of each other with discs from the first and second sets interleaved. A layer of loose diamond grains having a mean size in the range from about 18 microns to about 25 microns may be placed on top of the uppermost of the wafers, and the support body was inserted into the cup, with the non-planar end pushed against the layer.

The pre-sinter assembly thus formed may be assembled into a capsule for an ultra-high pressure press and subjected to a pressure of about 6.8 GPa and a temperature of at least about 1,450 degrees centigrade for about 10 minutes to sinter the diamond grains and form a PCD construction comprising a PCD structure bonded to the support body. The PCD construction may be processed by grinding and lapping to finish a tip for a road reconditioning pick.

Certain terms as used herein are briefly explained below.

As used herein, polycrystalline diamond (PCD) material comprises a mass (an aggregation of a plurality) of diamond grains, a substantial portion of which are directly inter-bonded with each other and in which the content of diamond is at least about 80 volume percent of the material. Interstices between the diamond grains may be at least partly filled with a binder material comprising a catalyst material for synthetic diamond, or they may be substantially empty. Catalyst material for synthetic diamond is capable of promoting the growth of synthetic diamond grains and or the direct inter-growth of synthetic or natural diamond grains at a temperature and pressure at which synthetic or natural diamond is thermodynamically more stable than graphite. Examples of catalyst materials for diamond are Fe, Ni, Co and Mn, and certain alloys including these. Bodies comprising PCD material may comprise at least a region from which catalyst material has been removed from the interstices, leaving interstitial voids between the diamond grains.

As used herein, a PCD grade is a variant of PCD material characterised in terms of the volume content and size of diamond grains, the volume content of interstitial regions between the diamond grains and composition of material that may be present within the interstitial regions. A grade of PCD material may be made by a process including providing an aggregation of diamond grains having a size distribution suitable for the grade, optionally introducing catalyst material or additive material into the aggregation, and subjecting the aggregation in the presence of a source of catalyst material for diamond to a pressure and temperature at which diamond is more thermodynamically stable than graphite and at which the catalyst material is molten. Under these conditions, molten catalyst material may infiltrate from the source into the aggregation and is likely to promote direct intergrowth between the diamond grains in a process of sintering, to form a PCD structure. The aggregation may comprise loose diamond grains or diamond grains held together by a binder material. Different PCD grades may have different microstructure and different mechanical properties, such as elastic (or Young's) modulus E, modulus of elasticity, transverse rupture strength (TRS), toughness (such as so-called $K_1C$ toughness), hardness, density and coefficient of thermal expansion (CTE). Different PCD grades may also perform differently in use. For example, the wear rate and fracture resistance of different PCD grades may be different.

Young's modulus is a type of elastic modulus and is a measure of the uni-axial strain in response to a uni-axial stress, within the range of stress for which the material behaves elastically. A preferred method of measuring the Young's modulus E is by means of measuring the transverse and longitudinal components of the speed of sound through the material, according to the equation $E=2\rho \cdot C_T^2(1+\upsilon)$, where $\upsilon=(1-2(C_T/C_L)^2)/(2-2(C_T/C_L)^2)$, $C_L$ and $C_T$ are respectively the measured longitudinal and transverse speeds of sound through it and $\rho$ is the density of the material. The longitudinal and transverse speeds of sound may be measured using ultrasonic waves, as is well known in the art. Where a material is a composite of different materials, the mean Young's modulus may be estimated by means of one of three formulas, namely the harmonic, geometric and rule of mixtures formulas as follows: $E=1/(f_1/E_1+f_2/E_2)$ $E=E_1^{f_1}+E_1^{f_2}$; and $E=f_1E_1+f_2E_2$; in which the different materials are divided into two portions with respective volume fractions of $f_1$ and $f_2$, which sum to one.

As used herein, the term "stress state" refers to a compressive, unstressed or tensile stress state. Compressive and tensile stress states are understood to be opposite stress states from each other. In a cylindrical geometrical system, the stress states may be axial, radial or circumferential, or a net stress state. As used herein, the term "residual stress state" refers to the stress state of a body or part of a body in the absence of an externally-applied loading force.

As used herein, "transverse rupture strength" (TRS) is measured by subjecting a specimen in the form of a bar having width W and thickness T to a load applied at three positions, two on one side of the specimen and one on the opposite side, and increasing the load at a loading rate until the specimen fractures at a load P. The TRS is then calculated based on the load P, dimensions of the specimen and the span L, which is the distance between the two load positions on one side. Such a measurement may also be referred to as a three-point bending test and is described by D. Munz and T. Fett in "Ceramics, mechanical properties, failure behaviour, materials selection" (1999, Springer, Berlin). The TRS corresponding to a particular grade of PCD material is measured measuring the TRS of a specimen of PCD consisting of that grade.

The $K_1C$ toughness of a PCD disc is measured by means of a diametral compression test, which is described by Lammer ("Mechanical properties of polycrystalline diamonds", Materials Science and Technology, volume 4, 1988, p. 23.) and Miess (Miess, D. and Rai, G., "Fracture toughness and thermal resistances of polycrystalline diamond compacts", Materials Science and Engineering, 1996, volume A209, number 1 to 2, pp. 270-276).

As used herein, the term "nano-diamond" refers to natural or synthetic diamond grains in the form of powder, individual grains or comprised in a material, having a mean size of at most about 500 nanometers.

The invention claimed is:

1. A tip for a degradation tool, the tip comprising a PCD structure joined to a cemented carbide substrate; the PCD structure comprising a plurality of strata arranged so that adjacent strata have alternating compressive and tensile stress states, adjacent strata comprising different PCD grades and being directly bonded to each other by inter-growth of diamond grains to form an integral, solid and stratified PCD structure comprising different, alternating amounts of metal catalyst for diamond; each stratum having a mean thickness of at most 500 microns; the PCD structure defining a working end including a rounded conical apex.

2. A tip as claimed in claim 1, in which the working end has the general shape of a rounded cone, including the rounded apex.

3. A tip as disclosed in claim 1, in which the PCD structure has a side forming a 35 degree to 55 degree angle with a central longitudinal axis of the tip.

4. A tip as claimed in claim 1, in which the rounded conical apex has a radius of curvature of 1.3 mm to 4 mm.

5. A tip as claimed in claim 4, in which the radius of curvature is 1.3 mm to 3.2 mm.

6. A tip as claimed in claim 1, in which the PCD structure is 2.5 mm to 10 mm thick from the apex to an interface between the PCD structure and the substrate.

7. A tip as claimed in claim 1, in which each stratum is at least 30 microns and at most 300 micron thick.

8. A tip as claimed in claim 1, in which the PCD structure comprises at least 5 strata.

9. A tip as claimed in claim 1, in which the strata are disposed adjacent a working surface defined by the PCD structure.

10. A tip as claimed in claim 1, in which the strata are arranged to be generally conformal with a working surface defined by the PCD structure.

11. A tip as claimed in claim 1, in which the PCD structure comprises a plurality of strata of alternating PCD grades, each stratum comprising one of two PCD grades, adjacent strata comprising different PCD grades.

12. A tip as claimed in claim 1, in which the PCD structure comprises a first region and a second region adjacent the first region, the second region being bonded to the first region by inter-growth of diamond grains; the first region comprising a first plurality of alternating strata each stratum having a thickness in the range of around 30 to 300 microns; the second region comprising a second plurality of strata, one or more stratum in the second region having a thickness greater than the thicknesses of the individual strata or layers in the first region, the first strata being in a state of residual compressive stress and the second strata being in a state of residual tensile stress.

13. A tip as claimed in claim 1, comprising a thermally stable region extending a depth of at least 50 microns from a surface of the PCD structure; in which the thermally stable region comprises at most 2 weight percent of catalyst material for diamond.

14. A tip as claimed in claim 1, in which any of the strata comprise at least 2 weight percent and at most 20 weight percent nano-diamond grains.

15. A tip as claimed in claim 1, in which any of the strata comprise salt.

16. A tip as claimed in claim 1, in which any of the strata comprise borides or carbide compounds of at least one of Ti, V or Nb.

17. A tip as claimed in claim 1, in which any of the strata comprise at least one of the metals Pd or Ni.

18. A degradation tool comprising a tip as claimed in claim 1.

19. A degradation tool as claimed in claim 18, comprising a pick for degrading asphalt or rock.

* * * * *